US00H002051H

(19) United States

(12) Statutory Invention Registration

Zhu et al.

(10) Reg. No.: US H2051 H

(43) Published: Nov. 5, 2002

(54) SYSTEM AND METHOD FOR PROVIDING MULTIPLE QUALITY OF SERVICE CLASSES

(75) Inventors: Yinjun Zhu; Carl Mansfield; Alan Carlton; Narayan Menon, all of Colorado Springs, CO (US)

(73) Assignee: Opuswave Networks, Inc., Colorado Springs, CO (US)

(21) Appl. No.: 09/676,114

(22) Filed: Sep. 29, 2000

(51) Int. Cl.[7] ..... H04L 12/56

(52) U.S. Cl. ..... 370/395.21

(56) References Cited

PUBLICATIONS

ETSI GSM 3G TS 24.065 Technical Description, GPRS SGSN Submetwork Dependent Convergence Protocol (SNDCP), ETSI TS 124 065 V3.1.0, pp. 7–11, 17–23, 35–37. Date: 1999.

ETSI GSM 03.60 Standard, GPRS Service Description, Stage 2, EN 301 344 V6.3.2, pp. 18–23, 58–75, 86–91. Date: 1997.

*Primary Examiner*—Daniel T. Pihulic

(57) ABSTRACT

A system for providing multiple quality of service classes to a subscriber using a terminal unit includes a gateway operable to communicate with a network and a base station coupled to the gateway. The base station is operable to communicate with the terminal unit over a wireless interface. The base station is also operable to receive a first packet associated with a first application and a second packet associated with a second application from the gateway. The applications are executed by the terminal unit. The base station is further operable to identify a first quality of service class associated with the first packet and a second quality of service class associated with the second packet using quality of service information. The quality of service information is associated with the first and second applications, and at least a portion of the quality of service information is identified by a network address. In addition, the base station is operable to communicate the first packet to the terminal unit using the first quality of service class and to communicate the second packet to the terminal unit using the second quality of service class.

25 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

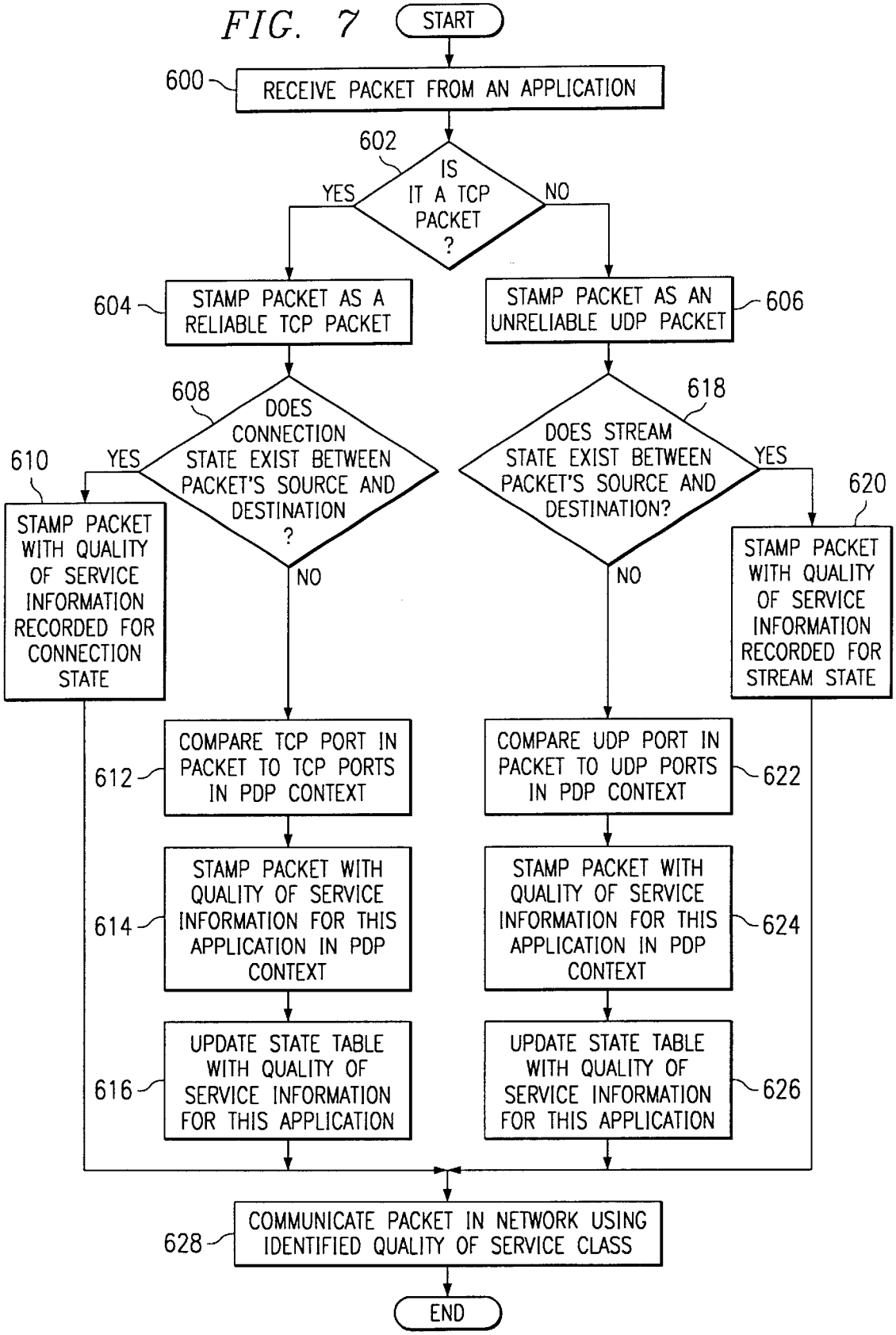
FIG. 7
START
600
RECEIVE PACKET FROM AN APPLICATION
602
IS IT A TCP PACKET ?
YES
NO
604
STAMP PACKET AS A RELIABLE TCP PACKET
STAMP PACKET AS AN UNRELIABLE UDP PACKET
606
608
DOES CONNECTION STATE EXIST BETWEEN PACKET'S SOURCE AND DESTINATION ?
618
DOES STREAM STATE EXIST BETWEEN PACKET'S SOURCE AND DESTINATION?
610
YES
STAMP PACKET WITH QUALITY OF SERVICE INFORMATION RECORDED FOR CONNECTION STATE
NO
YES
620
STAMP PACKET WITH QUALITY OF SERVICE INFORMATION RECORDED FOR STREAM STATE
NO
612
COMPARE TCP PORT IN PACKET TO TCP PORTS IN PDP CONTEXT
COMPARE UDP PORT IN PACKET TO UDP PORTS IN PDP CONTEXT
622
614
STAMP PACKET WITH QUALITY OF SERVICE INFORMATION FOR THIS APPLICATION IN PDP CONTEXT
STAMP PACKET WITH QUALITY OF SERVICE INFORMATION FOR THIS APPLICATION IN PDP CONTEXT
624
616
UPDATE STATE TABLE WITH QUALITY OF SERVICE INFORMATION FOR THIS APPLICATION
UPDATE STATE TABLE WITH QUALITY OF SERVICE INFORMATION FOR THIS APPLICATION
626
628
COMMUNICATE PACKET IN NETWORK USING IDENTIFIED QUALITY OF SERVICE CLASS
END

SYSTEM AND METHOD FOR PROVIDING MULTIPLE QUALITY OF SERVICE CLASSES

TECHNICAL FIELD OF THE INVENTION

This invention relates generally to the field of communications, and more specifically to a system and method for providing multiple quality of service classes.

BACKGROUND OF THE INVENTION

The use of packet data networks to transfer voice signals has become increasingly popular in recent years. These applications are often referred to as Voice over Internet Protocol (VoIP) or Internet Telephony applications. In these applications, analog voice signals are typically digitized, and the resulting data is segmented into packets. The packets are transmitted across the packet network to a destination node, where the packets are reassembled and the data converted back into analog signals.

Typical networks, such as the Global System for Mobile communication General Packet Radio Services (GSM/GPRS) network, use packet data protocol (PDP) contexts to support applications executed on a terminal unit. Each terminal unit uses a PDP context to support the transfer of packet data messages in the network. A single PDP context may support one application or multiple applications executed by a terminal unit. In conventional networks, each PDP context is associated with a network address, such as an Internet Protocol (IP) address.

Typical networks also use quality of service classes to identify how well an application executed in the network performs from the subscriber's perspective. For example, quality of service classes may be based on the speed, accuracy, and dependability of the network from the subscriber's point of view. Functions like data transfer operations may operate successfully using lower quality of service classes. These applications are usually not time-sensitive, so delays in the network are acceptable. On the other hand, real-time applications like Internet Telephony applications need higher qualities of service to perform optimally. Packets carrying digitized voice data need to arrive within a specific amount of time at the destination node. Otherwise, excessive delays reduce the quality of the voice signal that is produced at the destination node.

Conventional networks assign a quality of service class to each PDP context, and all applications executed by a subscriber under one PDP context receive the same quality of service class. To receive multiple quality of service classes, a subscriber typically establishes multiple PDP contexts, and each PDP context receives a different quality of service.

A problem with this approach is that conventional systems cannot differentiate between the applications executed under a single PDP context. A subscriber may execute a large number of applications under one PDP context, and only a few of the applications may require a high quality of service class. Conventional systems treat all of the subscriber's applications similarly, so each application receives the same quality of service class. As a result, all of the subscriber's applications may receive a high quality of service class, even though only a few of the applications actually require the high class to work optimally. A similar problem exists if the PDP context handles only a low quality of service level. An application requiring a higher quality of service class will not work well.

Another problem with this approach is that conventional systems cannot efficiently handle the traffic for applications executed by multiple subscribers. One subscriber who receives a high quality of service class may execute a large number of applications under one PDP context, and all of the applications receive the high quality of service. Because this subscriber's applications are all receiving the high quality of service, other subscribers may be unable to receive that quality of service. The system may use network resources to provide all of the first subscriber's applications with the high quality of service class, even though few of the applications require it. Even if the other subscribers wish to execute real-time applications, they may be forced to use a lower quality of service because network resources are unavailable. The conventional systems are unable to efficiently handle the traffic for multiple subscribers.

A further problem with this approach is that conventional systems assign each PDP context a separate IP address. A subscriber may receive multiple quality of service classes, but the subscriber must first establish multiple PDP contexts. This forces the conventional networks to assign multiple IP addresses to a single subscriber. The number of IP addresses may be limited in conventional networks, which also limits the number of PDP contexts that may be established by the subscribers in the networks. Some subscribers may be unable to receive multiple quality of services classes if the network cannot assign IP addresses to the additional PDP contexts established by the subscribers.

SUMMARY OF THE INVENTION

In accordance with the present invention, a system and method for providing multiple quality of service classes are provided that substantially reduce or eliminate disadvantages and problems associated with previously developed systems and methods.

In one embodiment of the present invention, a system for providing multiple quality of service classes to a subscriber using a terminal unit includes a gateway operable to communicate with a network and a base station coupled to the gateway. The base station is operable to communicate with the terminal unit over a wireless interface. The base station is also operable to receive a first packet associated with a first application and a second packet associated with a second application from the gateway. The applications are executed by the terminal unit. The base station is further operable to identify a first quality of service class associated with the first packet and a second quality of service class associated with the second packet using quality of service information. The quality of service information is associated with the first and second applications, and at least a portion of the quality of service information is identified by a network address. In addition, the base station is operable to communicate the first packet to the terminal unit using the first quality of service class and to communicate the second packet to the terminal unit using the second quality of service class.

In another embodiment of the present invention, a method for providing multiple quality of service classes to a subscriber using a terminal unit includes receiving a first packet associated with a first application and a second packet associated with a second application, where the applications are executed by the terminal unit. The method also includes identifying a first quality of service class associated with the first packet and a second quality of service class associated with the second packet using quality of service information. The quality of service information is associated with the first and second applications, and at least a portion of the quality of service information is identified by a network address.

The method further includes communicating the first packet over a wireless interface using the first quality of service class, and communicating the second packet over the wireless interface using the second quality of service class.

Embodiments of the present invention possess many technical advantages. In one embodiment, a communications system differentiates between the applications executed by a subscriber under a single packet data protocol (PDP) context. Applications that are executed by the same subscriber under one PDP context may receive different quality of service classes. For example, real-time applications may receive higher qualities of service, while data transfer applications executed under the same PDP context receive lower qualities of service. This allows each application executed by the subscriber to receive an appropriate quality of service.

Another technical advantage is the ability to handle traffic for applications executed by multiple subscribers more efficiently. Each application under a PDP context may have a corresponding quality of service class, which allows the system to limit the high quality of service to applications that actually need it. Rather than providing the high quality of service to all applications executed by a limited number of subscribers, the system may be able to provide the high quality of service class to a larger number of subscribers. By establishing a quality of service class for each application, traffic for multiple subscribers executing multiple applications may be handled more effectively.

In addition, a subscriber may receive multiple quality of service classes without forcing the communications system to assign multiple network addresses to the subscriber. A subscriber may establish a single PDP context and receive multiple quality of service classes. The subscriber is not required to establish multiple PDP contexts, so the system is not forced to assign multiple network addresses, such as Internet Protocol (IP) addresses, to each subscriber. The system remains free to assign the IP addresses to other elements in system 10. This also allows the system to provide multiple quality of service classes to any number of subscribers. The system may not be limited by the number of available IP addresses.

Other technical advantages are readily apparent to one of skill in the art from the attached Figures, description, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 7 is a flow diagram illustrating an exemplary method for performing snooping operations to provide multiple quality of service classes to a subscriber.

DETAILED DESCRIPTION OF THE DRAWINGS

Embodiments of the present invention and its advantages are best understood by referring to FIGS. 1 through 10 of the drawings, like numerals being used for like and corresponding parts of the various drawings.

Figure 1:
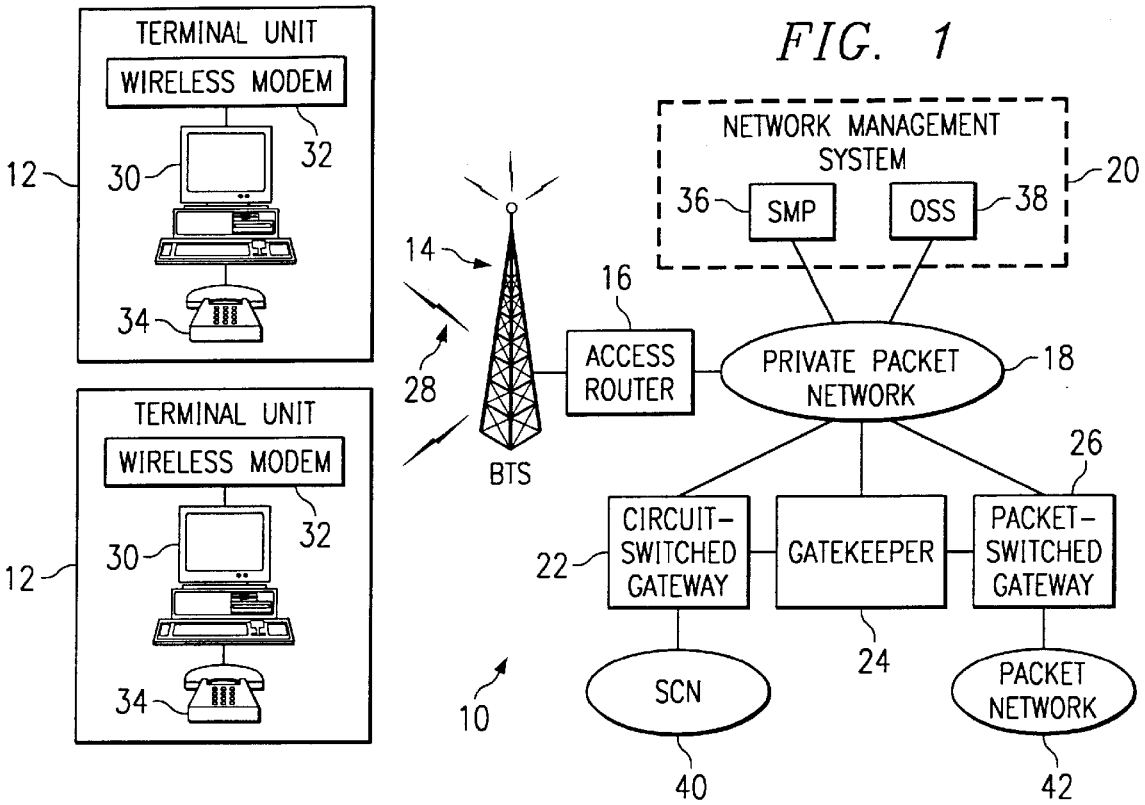
FIG. 1 is a block diagram illustrating an exemplary communications system.

FIG. 1 is a block diagram illustrating an exemplary communications system 10. In the illustrated embodiment, system 10 comprises a plurality of terminal units 12, a base station (BTS) 14, an access router 16, a private packet network 18, a network management system 20, a circuit-switched gateway 22, a gatekeeper 24, and a packet-switched gateway 26. Other embodiments of system 10 may be used without departing from the scope of the present invention. For example, the present invention may be implemented in any system that supports quality of service classes. This includes a Global System for Mobile communication Enhanced Data rate for Global Evolution (GSM/EDGE) system, a GSM General Packet Radio Services (GSM/GPRS) network, a Wideband Code Division Multiple Access (WCDMA) system, a Cellular Digital Packet Data (CDPD) system, and a Packet Data Services (PDS) system.

System 10 includes two planes of operation. One plane is a transmission plane, and the other plane is a signaling plane. The transmission plane transports packets that contain voice, fax, and data traffic, and the signaling plane carries control messages used to establish, maintain, and release connections in system 10. Each plane may also be subdivided to deal with packets carrying traffic to and from a packet network, and packets carrying traffic to and from an analog network.

In general, a terminal unit 12 executes one or more applications, and terminal unit 12 establishes a packet data protocol (PDP) context to support the transmission of data packets to and from the applications in system 10. Terminal unit 12 and base station 14 also establish quality of service classes for the applications that use the PDP context. In addition, terminal unit 12 and base station 14 perform multiplexing and demultiplexing operations, called "snooping operations," to allow the applications executed under the PDP context to receive different quality of service classes. By allowing each application in terminal unit 12 to receive the appropriate quality of service, system 10 may handle traffic for terminal units 12 running multiple applications more effectively.

Each terminal unit 12 communicates with base station 14 over a wireless interface 28. Terminal unit 12 provides packet voice, fax, and/or data services to a subscriber of system 10 by executing applications and exchanging packets of data with base station 14. Terminal unit 12 also establishes one or more PDP contexts to support the transmission of the packets in system 10. Each PDP context established by terminal unit 12 may be uniquely identified in system 10 by a network address, such as an Internet Protocol (IP) address. Each application executed on a terminal unit 12 may also be identified, for example, by a Transmission Control Protocol (TCP) or a User Datagram Protocol (UDP) port number. The network address and port numbers may be statically or dynamically assigned. In addition, in one embodiment, system 10 uses the International Telecommunications Union-Telecommunications (ITU-T) H.323 standard to transport voice traffic, and terminal unit 12 appears as a H.323 terminal in system 10. Terminal unit 12 may comprise any device capable of communicating with base station 14 over wireless interface 28. Terminal unit 12 could, for example, include a memory, a transmitter, and logic encoded in hardware, software, and/or firmware that configures the memory and/or transmitter as a terminal unit 12. In one embodiment, terminal unit 12 comprises a computer 30 coupled to a wireless modem 32. Computer 30 may support packet data, fax, and/or voice applications executed by the subscriber. A telephone 34 or a fax machine could also be coupled to computer 30. Other embodiments of terminal unit 12 may be used without departing from the scope of the present invention. For example, terminal unit 12 could also comprise a mobile telephone, such as a GSM mobile station.

Wireless interface 28 communicatively couples terminal unit 12 and base station 14. In this document, the term "wireless" designates the use of a radio or over-the-air interface to communicate with terminal unit 12. Wireless interface 28 may comprise any suitable circuit-switched or packet-switched wireless interface. Wireless interface 28 may, for example, comprise a GSM/EDGE interface.

Base station 14 is coupled to access router 16. In this document, the term "couple" refers to any direct or indirect connection between two or more elements in system 10, whether or not those elements physically contact one another. Base station 14 provides bi-directional communication with one or more terminal units 12 in a specified geographic area. For example, base station 14 transmits and receives packet messages to and from terminal units 12 over wireless interface 28. Base station 14 transmits and receives packet messages to and from private network 18 through access router 16. Each base station 14 may be uniquely identified in system 10 by a network address, such as an IP address, and the network address may be statically or dynamically assigned. Base station 14 may comprise any suitable device operable to facilitate communication with terminal units 12. Base station 14 may, for example, comprise one or more radio transceivers capable of transmitting packet-switched messages to and receiving messages from terminal unit 12 over wireless interface 28. Base station 14 could also include a memory and logic encoded in hardware, software, and/or firmware that configures the memory and/or the transmitters as a base station 14.

Access router 16 is coupled to base station 14 and private network 18. Access router 16 routes packets containing voice, fax, and/or data traffic in system 10. Access router 16 receives packets from base station 14 and routes the packets over private network 18. Access router 16 also receives packets from private network 18 for a terminal unit 12 served by base station 14, and access router 16 routes the packets to base station 14. Access router 16 may comprise any suitable device operable to route messages over private network 18. Access router 16 could, for example, comprise a wireless router and concentrator.

Private network 18 is coupled to access router 16, network management system 20, circuit-switched gateway 22, gatekeeper 24, and packet-switched gateway 26. Private network 18 facilitates communication between components in system 10 by transferring messages between the components. Private network 18 may comprise any suitable packet network, such as a local area network (LAN), a metropolitan area network (MAN), a wide area network (WAN), or any other communications system or systems at one or multiple locations.

Network management system 20 provides management functionality in system 10. Network management system 20 communicates with other components in system 10 and transmits management messages to the components. Network management system 20 also receives messages and responses from the components in system 10. In the illustrated embodiment, network management system 20 comprises a subscriber management platform (SMP) 36 and an operations support system (OSS) 38.

SMP 36 is coupled to private network 18. SMP 36 provides subscriber management and billing functionality in system 10. This may include, for example, authentication functionality to protect against fraud and customer registration functionality to collect customer data used in provisioning services and billing customers. This may also include rating functionality to create flexible pricing plans for subscribers, billing functionality to generate real-time or invoice customer bills, and customer management functionality to provide access to customer profiles, activities, and account balances. SMP 36 may comprise any suitable device operable to provide subscriber management functionality. In one embodiment, terminal unit 12 and base station 14 communicate with SMP 36 to retrieve subscriber profile information from SMP 36. Terminal unit 12 and base station 14 use the subscriber profile information to authenticate a terminal unit and provide quality of service classes to a subscriber. In a particular embodiment, terminal unit 12 and base station 14 use a terminal management protocol (TMP), and base station 14 and SMP 36 use a Remote Authentication Dial In User Service (RADIUS) protocol.

OSS 38 is coupled to private network 18. OSS 38 provides network management functionality the manage the components in system 10. This may include, for example, provisioning, administration, status, and performance monitoring functionality for the network components in system 10. This may also include configuration, fault, and security management. OSS 38 may comprise any suitable device operable to provide network management functionality. In one embodiment, OSS 38 may be identified by a network address, such as a statically or dynamically assigned IP address.

Circuit-switched gateway 22 is coupled to private network 18, gatekeeper 24, and a public switched circuit network (SCN) 40. SCN 40 may comprise any suitable circuit-switched network, such as a public switched telephone network (PSTN) or an integrated services digital network (ISDN). Gateway 22 facilitates communication between system 10 and SCN 40 by transferring messages between private network 18 and SCN 40. Gateway 22 also performs an interworking function to translate between the packet-switched signaling and transmission protocols used by private network 18 and the circuit-switched protocols used by SCN 40. In one embodiment, system 10 uses the protocols defined by the ITU-T H.323 standard, and gateway 22 interworks the H.323 signaling protocols with the circuit switched protocols of SCN 40. Gateway 22 may comprise any suitable device operable to facilitate communication between system 10 and SCN 40. Gateway 22 may, for example, comprise an H.323 gateway.

Gatekeeper 24 is coupled to private network 18, circuit-switched gateway 22, and packet-switched gateway 26. Gatekeeper 24 provides call control services in system 10. This may include, for example, tracking the location of each terminal unit 12 and routing messages to and from the base station 14 currently serving a particular terminal unit 12. This may also include address translation to map between the telephone number and current IP address of a terminal unit 12. Gatekeeper 24 may comprise any suitable device operable to provide call control services in system 10. In one embodiment, gatekeeper 24 comprises an H.323 gatekeeper.

Packet-switched gateway 26 is coupled to private network 18, gatekeeper 24, and a public packet-switched network 42. Public packet-switched network 42 may comprise any suitable packet-switched network, such as the Internet, a LAN, a MAN, a WAN, or any other communications system or systems in one or multiple locations. Packet-switched gateway 26 facilitates communication between system 10 and public network 42 by transferring messages between private network 18 and public network 42. Gateway 26 may comprise any suitable device operable to facilitate communication between system 10 and public network 42. Gateway 26 may, for example, comprise an access router that supports routing and firewalling functionality.

Although FIG. 1 illustrates one embodiment of system 10, numerous changes may be made to system 10 without departing from the scope of the present invention. For example, multiple base stations 14 may be used in system 10. Also, while gateway 22 and gatekeeper 24 are illustrated as separate units, gateway 22 and gatekeeper 24 may also be contained in one physical node.

Figure 2:
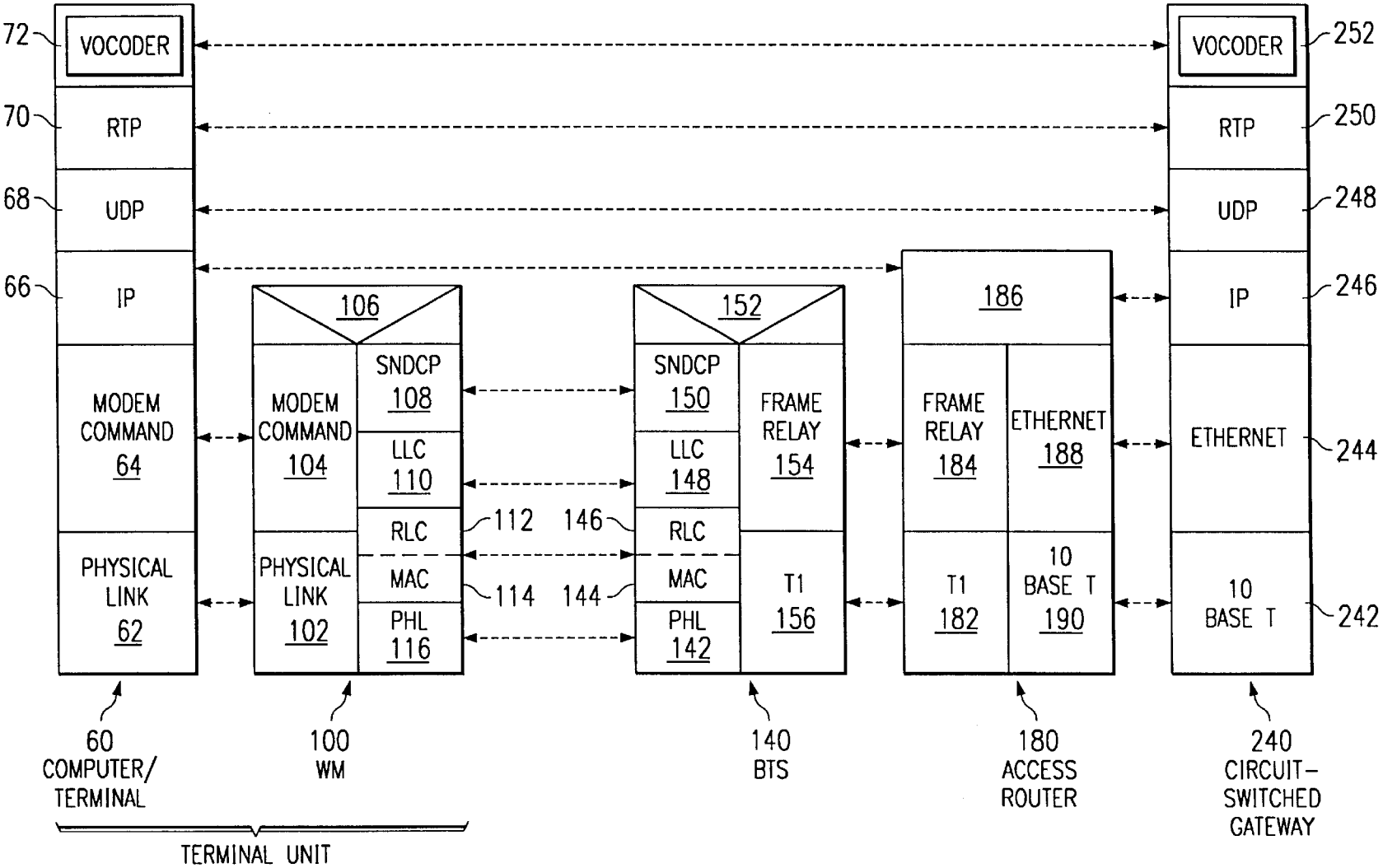
FIG. 2 is a block diagram illustrating an exemplary voice transmission plane in the communications system of FIG. 1.

FIG. 2 is a block diagram illustrating an exemplary voice transmission plane in communications system 10 of FIG. 1. In the illustrated embodiment, the packet data transmission plane comprises a computer/terminal protocol stack 60, a wireless modem (WM) protocol stack 100, a base station protocol stack 140, an access router protocol stack 180, and a circuit-switched gateway protocol stack 240. Other embodiments of the voice transmission plane may be used in system 10 without departing from the scope of the present invention.

Computer/terminal protocol stack 60 comprises a physical link layer 62, a modem command layer 64, an Internet Protocol (IP) layer 66, a UDP layer 68, a Realtime Transfer Protocol (RTP) layer 70, and a vocoder layer 72. Wireless modem protocol stack 100 comprises a physical link layer 102, a modem command layer 104, a relay 106, a subnetwork dependent convergence protocol (SNDCP) layer 108, a logical link control (LLC) layer 110, a radio link control (RLC) layer 112, a medium access control (MAC) layer 114, and a physical (PHL) layer 116.

Base station protocol stack 140 comprises a physical layer 142, a MAC layer 144, a RLC layer 146, a LLC layer 148, a SNDCP layer 150, a relay 152, a frame relay layer 154, and a T1 layer 156. Access router protocol stack 180 comprises a T1 layer 182, a frame relay layer 184, an IP layer 186, an Ethernet layer 188, and a 10-base-T layer 190. Circuit-switched gateway protocol stack 240 comprises a 10-base-T layer 242, an Ethernet layer 244, an IP layer 246, a UDP layer 248, a RTP layer 250, and a vocoder layer 252.

Physical link layers 62 and 102 manage the interface between computer 30 and wireless modem 32. Physical link layers 62 and 102 may, for example, support a personal computer memory card international association (PCMCIA) interface. Modem command layers 64 and 104 support control of wireless modem 32 by computer 30. In one embodiment, computer 30 controls wireless modem 32 using an AT command set. In a particular embodiment, terminal unit 12 uses an AT command set based on the GSM 07.60 standard, entitled "Mobile Station (MS) Supporting GPRS."

Vocoder layers 74 and 252 support vocoding functions in terminal unit 12 and circuit-switched gateway 22. In one embodiment, terminal units 12 have an audio codec to encode and decode voice traffic. Terminal units 12 may support a variety of coding standards, including ITU-T Recommendations G.711, G.722, G.728, G.729, and G.723.1, as well as MPEG 1 audio and GSM Full Rate, Half Rate and Enhanced Full Rate vocoders. RTP layers 72 and 250, UDP layers 70 and 248, and IP layers 66, 186, and 246 support the transport of voice traffic between terminal unit 12 and circuit-switched gateway 22. The encoded voice traffic may be transmitted between terminal unit 12 and gateway 22 in RTP packets carried over a UDP/IP connection. Transmission of the RTP packets may also be supplemented by the RTP Control Protocol (RTCP) to provide control and identification functionality in system 10.

Relay 106 transfers packet data messages between the interface with computer 30 and the interface with base station 14. This may include, for example, transferring packet messages between a PCMCIA interface and SNDCP layer 108. SNDCP layers 108 and 150 map data packets containing voice, fax, and traffic onto LLC frames for transport between terminal unit 12 and base station 14. SNDCP layers 108 and 150 also perform encryption, header compression, and data compression. LLC layers 110 and 148 provide a reliable ciphered logical link between terminal unit 12 and base station 14, and the packet data messages are transferred between LLC layers 110 and 148 in LLC frames. RLC layers 112 and 146 and MAC layers 114 and 144 support the transfer of information over wireless interface 28. RLC layers 112 and 146 and MAC layers 114 and 144 may, for example, map LLC frames from LLC layers 110 and 148 onto RLC data blocks transmitted over wireless interface 28. Physical layers 116 and 142 manage wireless interface 28 between terminal unit 12 and base station 14.

Relay 152 transfers packet messages between the wireless interface with terminal unit 12 and the interface with access router 16. This may include, for example, transferring packet messages between SNDCP layer 150 and frame relay layer 154. In one embodiment of base station 14, a temporary logical link identity (TLLI) is assigned to each wireless modem 32 in LLC layer 148, and a switched virtual circuit (SVC) is established for each wireless modem 32 in frame relay layer 154. In this embodiment, relay 152 also provides a bridging function between the TLLIs and the SVCs to provide address resolution between the two identities established for each wireless modem 32.

Frame relay layers 154 and 184 provide a link layer transport protocol between base station 14 and access router 16 to transport packet messages between base station 14 and access router 16. T1 layers 156 and 182 support the physical interface between base station 14 and access router 16. Ethernet layers 188 and 244 provide a transport protocol between access router 16 and circuit-switched gateway 22. Ethernet layers 188 and 244 transport packet messages between access router 16 and circuit-switched gateway 22. 10-base-T layers 190 and 242 support the physical interface between access router 16 and circuit-switched gateway 22.

In one embodiment, LLC layers 110 and 148 support different quality of service classes in system 10. SNDCP layers 108 and 150 perform snooping operations to provide a quality of service class to each application executed by a terminal unit 12. Although FIG. 2 only illustrates the voice transmission plane, LLC layers 110 and 148 and SNDCP layers 108 and 150 may also be used in the voice signaling plane and the packet data planes.

Figure 3:
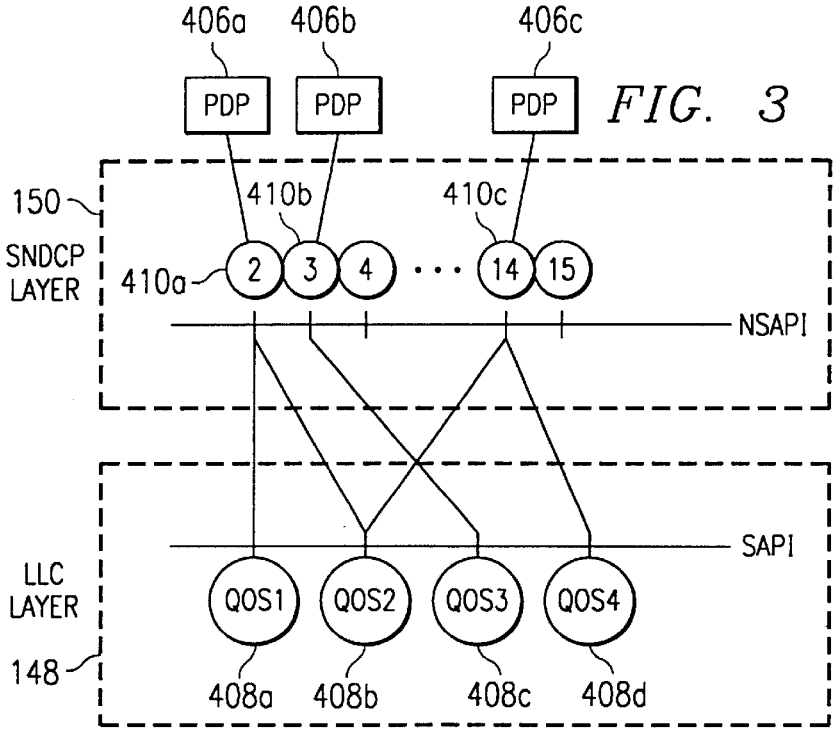
FIG. 3 is a block diagram illustrating an exemplary subnetwork dependent convergence protocol (SNDCP) layer providing multiple quality of service classes to subscribers in the communications system of FIG. 1.

FIG. 3 is a block diagram illustrating an exemplary subnetwork dependent convergence protocol (SNDCP) layer 150 providing multiple quality of service classes to subscribers in communications system 10 of FIG. 1. Although FIG. 3 is described with respect to SNDCP layer 150 in base station 14, SNDCP layer 108 in terminal unit 12 may be the same or similar to SNDCP layer 150.

LLC layer 148 provides the different quality of service classes in system 10. The different quality of service classes may, for example, use different reliability, delay, precedence, mean throughput, and peak throughput parameters. The reliability parameter establishes data transfer requirements to transport packets in system 10, such as whether to use acknowledged TCP/IP or unacknowledged UDP/IP transfer mode. The delay parameter specifies the latency, or delay, that occurs when transporting packets in system 10. The precedence parameter defines a priority level used to provision services to subscribers, and system 10 provides services to applications with higher priorities sooner than applications with lower priorities. The mean throughput parameter identifies the average amount of data that may be transported in system 10, and the peak throughput parameter identifies the maximum rate at which data may be transferred in system 10.

LLC layer 148 uses Service Access Point Identifiers (SAPIs) 408 to identify the different quality of service classes supported in system 10. In the illustrated embodiment, LLC layer 148 uses four SAPIs 408, and LLC layer 148 provides four different quality of service classes. Other embodiments of LLC layer 148 may be used without departing from the scope of the present invention. In one embodiment, system 10 supports three quality of service classes. One class supports real-time, reliable transport of voice traffic, and a second class supports non-real-time, unreliable transport of packet data. A third class supports non-real-time transport of signaling messages in system 10.

SNDCP layer 150 provides a quality of service class to each application executed on terminal unit 12 by performing snooping operations. To perform the snooping operations, SNDCP layer 150 identifies the quality of service class assigned to an application executed on terminal unit 12. After identifying the quality of service class for the application, SNDCP layer 150 routes a packet to the SAPI 408 in LLC layer 148 that supports the identified quality of service.

To identify an application's quality of service, SNDCP layer 150 may access a PDP context 406 that the application uses to communicate in system 10. In one embodiment, a subscriber establishes a PDP context 406 to support the transmission of packets between terminal unit 12 and components in system 10. The PDP context 406 contains quality of service parameters for the applications executed by terminal unit 12. A PDP context 406 may support one application or multiple applications executed by terminal unit 12.

SNDCP layer 150 uses Network Service Access Point Identifiers (NSAPIs) 410 to identify different PDP contexts 406. SNDCP layer 150 may use NSAPIs 410 to access a PDP context 406 and retrieve quality of service parameters for an application. After identifying the quality of service class assigned to the application, SNDCP layer 150 communicates the packet to LLC layer 148 through the SAPI 408 that supports the identified quality of service. LLC layer 148 communicates the packet to terminal unit 12 using the identified quality of service.

In the illustrated embodiment, NSAPIs 410 identify three different PDP contexts 406. NSAPI 410*a* identifies PDP context 406*a*, NSAPI 410*b* identifies PDP context 406*b*, and NSAPI 410*c* identifies PDP context 406*c*. SNDCP layer 150 provides multiple quality of service classes to PDP contexts 406*a* and 406*c* and one quality of service class to PDP context 406*b*. PDP context 406*a* receives service from SAPIs 408*a* and 408*b*, and PDP context 406*c* receives service from SAPI 408*b* and 408*d*. PDP context 406*b* only receives service from SAPI 408*c*. SNDCP layer 150 may receive a packet for an application that uses PDP context 406*a*, and SNDCP layer 150 determines which quality of service the application is entitled to receive. SNDCP layer 150 then routes the packet to either SAPI 408*a* or 408*b*. Similarly, SNDCP layer 150 may receive a packet for an application that uses PDP context 406*c*, and SNDCP layer 150 routes the packet to either SAPI 408*b* or 408*d*. When SNDCP layer 150 receives a packet for an application under PDP context 406*b*, SNDCP layer 150 routes the packet to SAPI 408*c*.

In FIG. 3, the links between PDP contexts 406 and NSAPIs 410, and between NSAPIs 410 and SAPIs 408, are for illustration only. System 10 may configure NSAPIs 410 to identify PDP contexts 406 in any suitable manner. System 10 may also link NSAPIs 410 and SAPIs 408 in any suitable manner to provide appropriate quality of service classes to different PDP contexts 406.

Figure 4:
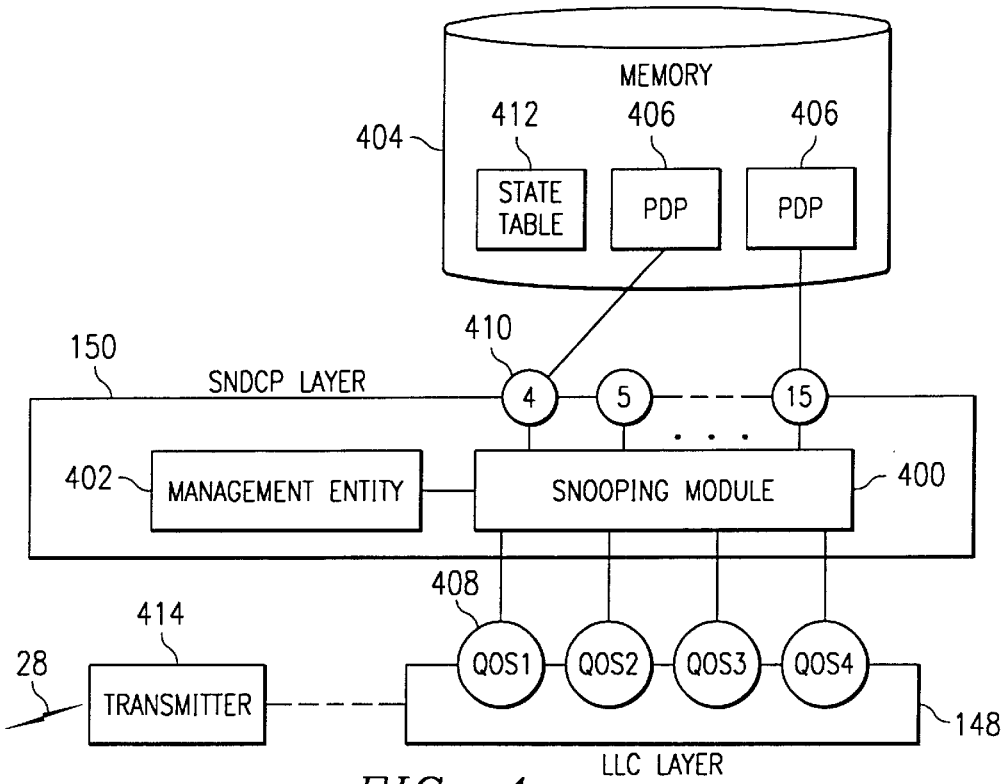
FIG. 4 is a block diagram illustrating the SNDCP layer of the communications system of FIG. 1.

FIG. 4 is a block diagram illustrating the SNDCP layer 150 of communications system 10 of FIG. 1. In the illustrated embodiment, SNDCP layer 150 comprises a snooping module 400 and a management entity 402. Snooping module 400 communicates with a memory 404 in base station 14 to provide quality of service classes to applications executed by terminal units 12. Other embodiments of SNDCP layer 150 may be used without departing from the scope of the present invention. Although FIG. 4 is described with respect to base station 14, terminal unit 12 may be the same or similar to base station 14.

Snooping module 400 in SNDCP layer 150 provides a quality of service class to each application executed on terminal unit 12 by performing snooping operations. To perform the snooping operations, snooping module 400 identifies the quality of service class that is used to transport a packet to an application executed on terminal unit 12. Snooping module 400 may access PDP contexts 406 and/or a state table 412, which are stored in memory 404. PDP contexts 406 and state table 412 contain quality of service information for applications executed by terminal unit 12. After identifying the quality of service class for the application, snooping module 400 routes the packet to the SAPI 408 in LLC layer 148 that supports the identified quality of service.

Figure 5:
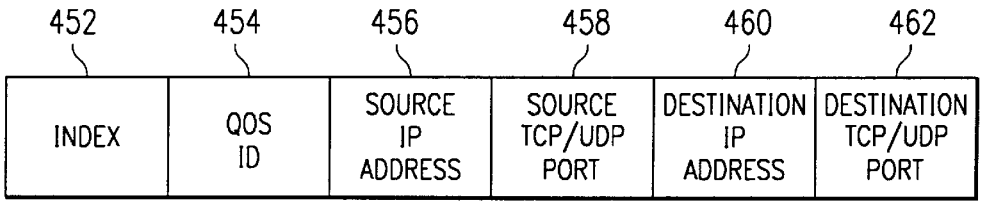
FIG. 5 is a block diagram illustrating an exemplary entry in a state table in the communications system of FIG. 1.

To identify an application's quality of service, snooping entity 400 may access a PDP context 406 and/or state table 412 in memory 404. The PDP context 406 established by a terminal unit 12 is stored in terminal unit 12 and in memory 404 in base station 14, and each PDP context 406 is identified in system 10 by a network address, such as an IP address. Snooping module 400 uses NSAPIs 410 to access a PDP context 406 in memory 404 and retrieve quality of service parameters for an application. Snooping module 400 may also access state table 412 in memory 404 and retrieve quality of service parameters for the application. One embodiment of state table 412 is shown in FIG. 5, which is described below.

After identifying an application's quality of service, snooping module 400 performs snooping operations to provide the identified quality of service class to the application. Using the quality of service information retrieved from state table 412 or PDP context 406, snooping module 400 stamps the packet with the quality of service parameters that are used to transport the packet to terminal unit 12. Using the stamp, snooping module 400 routes the packet to the SAPI 408 that supports the application's quality of service, and LLC layer 148 receives the packet and places the packet in an LLC frame. After passing through LLC layer 148, the packet is transmitted to terminal unit 12 by a transmitter 414 in base station 14.

Snooping module 400 may also receive a data packet from an application executed on terminal unit 12 over wireless interface 28. The packet from terminal unit 12 arrives in an LLC frame, and the LLC frame is identified by one of the SAPIs 408. Snooping module 400 uses SAPI 408 to identify the quality of service class assigned to the packet, and snooping module 400 communicates the packet through system 10 using that quality of service.

Management entity 402 is coupled to snooping module 400. Management entity 402 is operable to control snooping module 400. Management entity 400 may, for example, inform snooping entity 400 when another PDP context 406 is activated or deactivated. Management entity 402 may comprise any suitable device operable to manage snooping module 400.

Memory 404 is coupled to snooping entity 400. Memory 400 is operable to store PDP contexts 406 and state table 412, which contain quality of service information for different applications executed by terminal units 12. Memory 404 is also operable to facilitate retrieval of the information in PDP contexts 406 and state table 412 by snooping module 400. Memory 404 may comprise any suitable memory operable to store quality of service information.

State table 412 stores quality of service information for applications that have previously received packet messages from base station 412. In one embodiment, when the first packet for an application arrives at base station 14, snooping module 400 accesses state table 412 to locate quality of service information for the application. If snooping module 400 fails to find quality of service information for the application in state table 12, snooping module 400 accesses the PDP context 406 and retrieves the quality of service information for the application. Snooping module 400 stores the quality of service information in state table 412, and snooping module 400 communicates the first packet to LLC layer 148 through the appropriate SAPI 408. When more packets for the same application arrive at base station 14, snooping module 400 uses the quality of service information in state table 412 to communicate the packets to the appropriate SAPI 408. In one embodiment, snooping module 400 uses state table 412 to store the connection states of applications that use the TCP/IP transfer mode and the stream states of applications that use the UDP/IP transfer mode.

Transmitter 414 is operable to communicate with terminal unit 12 over wireless interface 28. For example, transmitter 414 may transmit packets to terminal unit 12. Transmitter 414 may include any suitable device operable to transmit packets to terminal unit 12. Transmitter 414 includes transceivers that are operable to transmit packets to and receive packets from terminal unit 12.

FIG. 5 is a block diagram illustrating an exemplary entry 450 in state table 412 in communications system 10 of FIG. 1. State table 412 may comprise a plurality of entries 450, and each entry 450 includes an index 452, a quality of service identifier (QOS ID) 454, a source IP address 456, a source TCP/UDP port number 458, a destination IP address 460, and a destination TCP/UDP port number 462. Other embodiments of entry 450 may be used without departing from the scope of the present invention.

Index 452 identifies entry 450 in state table 412. Quality of service identifier 454 identifies one or more quality of service parameters that an application associated with entry 450 may receive in system 10. Quality of service identifier 454 may, for example, identify the delay parameter associated with the quality of service class that the application receives in system 10. Source IP address 456 identifies the IP address of the terminal unit 12 executing the application associated with entry 450, and source TCP/UDP port number 458 identifies the TCP or UDP port number of the application. Destination IP address 460 identifies the IP address of the destination in system 10 that is receiving the packet message from the application. The destination may, for example, be another terminal unit 12, circuit-switched gateway 22, or packet-switched gateway 26. Destination TCP/UDP port number 462 identifies the TCP or UDP port number of an application at the destination that is receiving the packet.

When snooping module 400 receives a packet for an application, snooping module 400 accesses state table 412. Snooping module 400 extracts the source and destination IP addresses and TCP or UDP port numbers from the packet. Snooping module 400 compares the extracted information to the entries 450 in state table 412. If snooping module 400 identifies an entry 450, snooping module 400 uses the quality of service identifier 454 in entry 450 to determine the quality of service class used to communicate the packet to terminal unit 12. Otherwise, snooping module 400 accesses the PDP context 406 that corresponds to the application. Snooping module 400 may, for example, use the IP addresses associated with the PDP contexts 406 to identify the application's PDP context 406. Using PDP context 406, snooping module 400 identifies the quality of service class for the application. Snooping module 400 also stores the information from PDP context 406 in a new entry 450 in state table 412. When additional packets arrive for the application, snooping module 400 uses the new entry 450 in state table 412 to communicate the packets to terminal unit 12.

Figure 6:
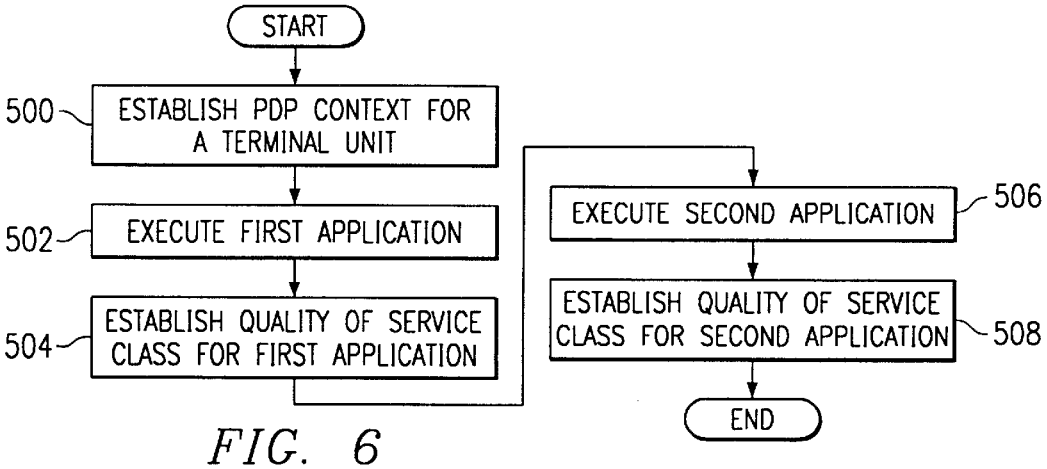
FIG. 6 is a flow diagram illustrating an exemplary method for providing multiple quality of service classes to a subscriber.

FIG. 6 is a flow diagram illustrating an exemplary method for providing multiple quality of service classes to a subscriber. A subscriber using a terminal unit 12 establishes a PDP context 406 at a step 500. This may include, for example, establishing the throughput parameter(s) in PDP context 406 using conventional PDP context setup procedures. The subscriber executes a first application at a step 502. The quality of service class for the first application is established at a step 504. This may include, for example, terminal unit 12 receiving a packet from the first application and identifying the quality of service class using state table 412 and/or PDP context 406. The subscriber executes a second application at a step 506. The second application may be executed under the same PDP context 406 as the first application. The quality of service class for the second application is established at step 508. This may include, for example, terminal unit 12 receiving a packet from the second application and identifying the quality of service class using state table 412 and/or PDP context 406. The quality of service class for the second application may be the same as the quality of service class of the first application, or the second class may be different than the first class. To provide the quality of service classes to the first and second applications, snooping module 400 performs snooping operations.

FIG. 7 is a flow diagram illustrating an exemplary method for performing snooping operations to provide multiple quality of service classes to a subscriber. In one embodiment, the quality of service classes in system 10 include reliability and delay parameters, and the illustrated method dynamically establishes the reliability and delay parameters for a packet. Although the following description describes the method with respect to SNDCP layer 108 in terminal unit 12, the same or similar method may be used by SNDCP layer 150 in base station 14.

Terminal unit 12 receives a packet from an application executed on terminal unit 12 at a step 600. Terminal unit 12 determines whether the packet is a TCP packet at a step 602. This may include, for example, snooping module 400 examining a header in the packet. If the packet is a TCP packet, snooping module 400 stamps the packet as a reliable TCP packet at a step 604. This establishes the reliability parameter used to define a quality of service class in system 10. Snooping module 400 stamps the packet as reliable because terminal unit 12 receives a confirmation over a TCP/IP connection when the packet arrives successfully at its destination. Otherwise, snooping module 400 stamps the packet as an unreliable UDP packet at a step 606. UDP packets are stamped as unreliable since no confirmation may be received.

For TCP packets, after stamping the packet as reliable at step 604, snooping module 400 determines if a connection state exists between the source and destination TCP/IP addresses contained in the packet at a step 608. This may include, for example, snooping module 400 accessing state table 412 and determining if an entry 450 matches the source and destination IP addresses and TCP ports contained in the packet. If snooping module 400 locates a matching entry 450, a connection state exists between the source and destination addresses, and snooping module 400 stamps the packet with the quality of service information recorded for this connection state at a step 610. This may include, for example, snooping module 400 retrieving the quality of service identifier 454 from entry 450, and snooping module 400 stamping the packet with the delay parameter identified by entry 450. SNDCP layer 108 communicates the packet to base station 14 at a step 628. This may include, for example, snooping module 400 using the reliability and delay parameters to communicate the packet to the appropriate SAPI 408 in LLC layer 148.

If a connection state does not exist between the source and destination addresses at step 608, snooping module 400 compares the TCP port contained in the packet to TCP ports of known applications at a step 612. This may include, for example, snooping module 400 accessing PDP context 406 in memory 404 and comparing the TCP port in the packet to the TCP ports of the applications that are executed using PDP context 406. When snooping module 400 locates a known application with a matching TCP port, snooping module 400 stamps the packet with the quality of service information stored in PDP context 406 for this application at a step 614. Snooping module 400 updates state table 412 at a step 616. This may include, for example, snooping module 400 storing the source and destination TCP/IP addresses of the packet and the quality of service information for the application in state table 412. SNDCP layer 108 communicates the packet to base station 14 at step 628.

For UDP packets, after stamping the packet as unreliable at step 606, snooping module 400 determines if a stream state exists between the source and destination UDP/IP addresses contained in the packet at a step 618. This may include, for example, snooping module 400 accessing state table 412 and determining if an entry 450 matches the source and destination IP addresses and UDP ports contained in the packet. If snooping module 400 locates a matching entry 450, a stream state exists between the source and destination addresses. Snooping module 400 stamps the packet with the quality of service information recorded for this stream state at a step 620. This may include, for example, retrieving the quality of service identifier 454 from entry 450. SNDCP layer 108 communicates the packet to base station 14 at step 628.

If a stream state does not exist between the source and destination addresses at step 618, snooping module 400 compares the UDP port contained in the packet to UDP ports of known applications at a step 622. This may include, for example, snooping module 400 accessing PDP context 406 in memory 404 and comparing the UDP port in the packet to the UDP ports of the applications that are executed using PDP context 406. When snooping module 400 locates a known application with a matching UDP port, snooping module 400 stamps the packet with the quality of service information stored in PDP context 406 for this application at a step 624. Snooping module 400 updates state table 412 at a step 626. This may include, for example, snooping module 400 storing the source and destination UDP/IP addresses for the packet and the quality of service information for the application in state table 412. SNDCP layer 108 communicates the packet to base station 14 at step 628.

Although FIG. 7 illustrates one exemplary method for performing snooping operations to provide multiple quality of service classes to a subscriber in system 10, numerous changes may be made to the method without departing from the scope of the present invention. For example, snooping module 400 may update state table 412 before stamping the packet with the quality of service information stored in PDP context 406. Also, terminal unit 12 may support other transmission protocols in addition to or in place of the TCP/IP and UDP/IP protocols, and SNDCP layer 108 may stamp the packets with appropriate reliability and delay parameters. In addition, SNDCP layer 108 may also perform TCP/IP header compression functions, and SNDCP layer 108 may merge the snooping method illustrated in FIG. 7 with the TCP/IP header compression algorithm. The snooping method and compression algorithm both check the header of a packet, such as in step 602 in FIG. 7. Combining the snooping method and compression algorithm may reduce the overall time needed to perform both functions.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A device for providing multiple quality of service classes to a subscriber using a terminal unit, comprising:

a memory operable to store quality of service information associated with a first application and a second application executed on the terminal unit, at least a portion of the quality of service information identified by a network address;

a snooping module coupled to the memory, the snooping module operable to receive a first packet associated with the first application and a second packet associated with the second application, the snooping module also operable to identify a first quality of service class associated with the first packet and a second quality of service class associated with the second packet using at least a portion of the quality of service information; and a transmitter operable to communicate the first packet over a wireless interface using the first quality of service class and to communicate the second packet over the wireless interface using the second quality of service class.

2. The device of claim 1, wherein the memory comprises a packet data protocol (PDP) context, the PDP context containing at least a portion of the quality of service information, the PDP context identified by the network address.

3. The device of claim 2, wherein the snooping module is operable to:

retrieve at least a portion of the quality of service information contained in the PDP context; and identify the first quality of service class using the retrieved quality of service information.

4. The device of claim 1, wherein the memory comprises a state table, the state table comprising an entry containing at least a portion of the quality of service information.

5. The device of claim 4, wherein the entry in the state table further comprises a source address and a destination address, the source and destination addresses associated with the first application.

6. The device of claim 5, wherein the first packet comprises a second source address and a second destination address, and wherein the snooping module is operable to:

compare the source address in the entry to the second source address in the first packet;

compare the destination address in the entry to the second destination address in the first packet; and identify the first quality of service class using the quality of service information in the entry when the source addresses match and the destination addresses match.

7. The device of claim 1, wherein the memory, snooping module, and transmitter are configured as a base station.

8. The device of claim 1, wherein the memory, snooping module, and transmitter are configured as the terminal unit.

9. A system for providing multiple quality of service classes to a subscriber using a terminal unit, comprising:

a gateway operable to communicate with a network; and a base station coupled to the gateway, the base station operable to communicate with the terminal unit over a wireless interface, the base station also operable to:

receive a first packet associated with a first application and a second packet associated with a second application from the gateway, the applications executed by the terminal unit;

identify a first quality of service class associated with the first packet and a second quality of service class associated with the second packet using quality of service information, the quality of service information associated with the first and second applications, at least a portion of the quality of service information identified by a network address;

communicate the first packet to the terminal unit using the first quality of service class; and communicate the second packet to the terminal unit using the second quality of service class.

10. The system of claim 9, wherein the base station comprises:

a memory operable to store the quality of service information;

a snooping module coupled to the memory, the snooping module operable to receive the first packet and the second packet, the snooping module also operable to identify the first quality of service class and the second quality of service class; and a transmitter operable to communicate the first packet over the wireless interface using the first quality of service class and to communicate the second packet over the wireless interface using the second quality of service class.

11. The system of claim 10, wherein the memory comprises:

a packet data protocol (PDP) context containing at least a portion of the quality of service information, the PDP context identified by the network address; and a state table comprising an entry containing at least a portion of the quality of service information.

12. The system of claim 11, wherein the entry in the state table further comprises a source address and a destination address, the source and destination addresses associated with the first application.

13. The system of claim 12, wherein the first packet comprises a second source address and a second destination address, and wherein the snooping module is operable to:

compare the source address in the entry to the second source address in the first packet;

compare the destination address in the entry to the second destination address in the first packet;

identify the first quality of service class using the quality of service information in the entry when the source addresses match and the destination addresses match; and identify the first quality of service class using the quality of service information in the PDP context when at least one of the source addresses and the destination addresses fail to match.

14. The system of claim 9, further comprising the terminal unit.

15. The system of claim 14, wherein the terminal unit comprises:

a memory operable to store the quality of service information;

a snooping module coupled to the memory, the snooping module operable to receive a third packet associated with the first application and a fourth packet associated with the second application, the snooping module also operable to identify a third quality of service class associated with the third packet and a fourth quality of service class associated with the fourth packet using at least a portion of the quality of service information; and a transmitter operable to communicate the third packet over the wireless interface using the third quality of service class and to communicate the fourth packet over the wireless interface using the fourth quality of service class.

16. The system of claim 9, wherein the gateway comprises a circuit-switched gateway operable to communicate with a circuit-switched network.

17. The system of claim 9, further comprising a packet network coupling the gateway and the base station.

18. A method for providing multiple quality of service classes to a subscriber using a terminal unit, comprising:

receiving a first packet associated with a first application and a second packet associated with a second application, the applications executed by the terminal unit;

identifying a first quality of service class associated with the first packet and a second quality of service class associated with the second packet using quality of service information, the quality of service information associated with the first and second applications, at least a portion of the quality of service information identified by a network address;

communicating the first packet over a wireless interface using the first quality of service class; and communicating the second packet over the wireless interface using the second quality of service class.

19. The method of claim 18, wherein at least a portion of the quality of service information is contained in a packet data protocol (PDP) context, the PDP context identified by the network address.

20. The method of claim 19, wherein identifying the first quality of service class comprises:

retrieving at least a portion of the quality of service information contained in the PDP context; and identifying the first quality of service class using the retrieved quality of service information.

21. The method of claim 18, wherein at least a portion of the quality of service information is contained in a state table.

22. The method of claim 21, wherein an entry in the state table comprises the quality of service information, a source address, and a destination address, the source and destination addresses associated with the first application.

23. The method of claim 22, wherein the first packet comprises a second source address and a second destination address, and wherein identifying the first quality of service class comprises:

comparing the source address in the entry to the second source address in the first packet;

comparing the destination address in the entry to the second destination address in the first packet; and identifying the first quality of service class using the quality of service information in the entry when the source addresses match and the destination addresses match.

24. The method of claim 18, wherein communicating the first packet over a wireless interface comprises communicating the first packet to a base station.

25. The method of claim 18, wherein communicating the first packet over a wireless interface comprises communicating the first packet to a terminal unit.

* * * * *